Aug. 21, 1962     D. B. HARGREAVES ET AL     3,049,851
APPARATUS FOR WORKING TURF
Filed July 27, 1959     3 Sheets-Sheet 1
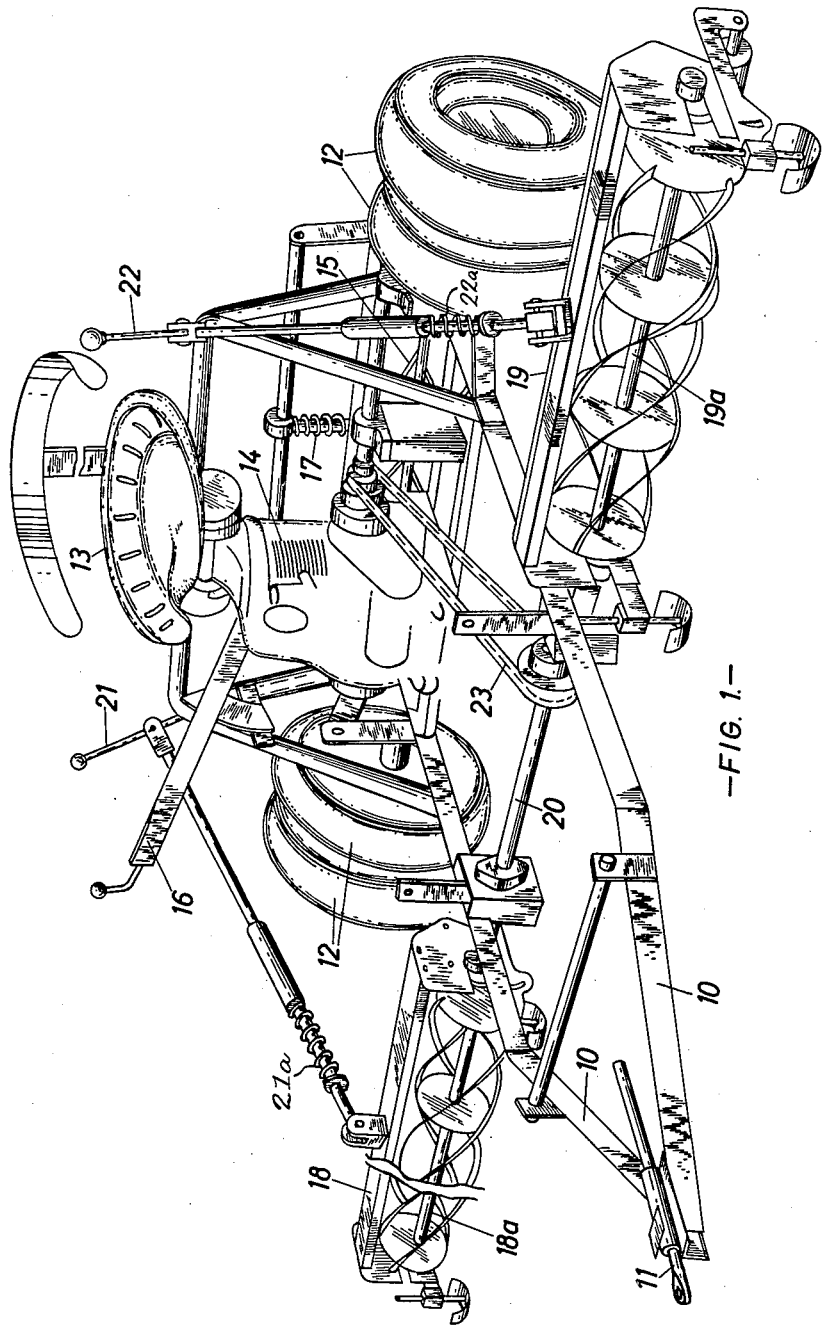
–FIG. 1.–
INVENTORS.
DEREK BURTT HARGREAVES
and ERIC STANIFORTH
BY
ATTORNEY

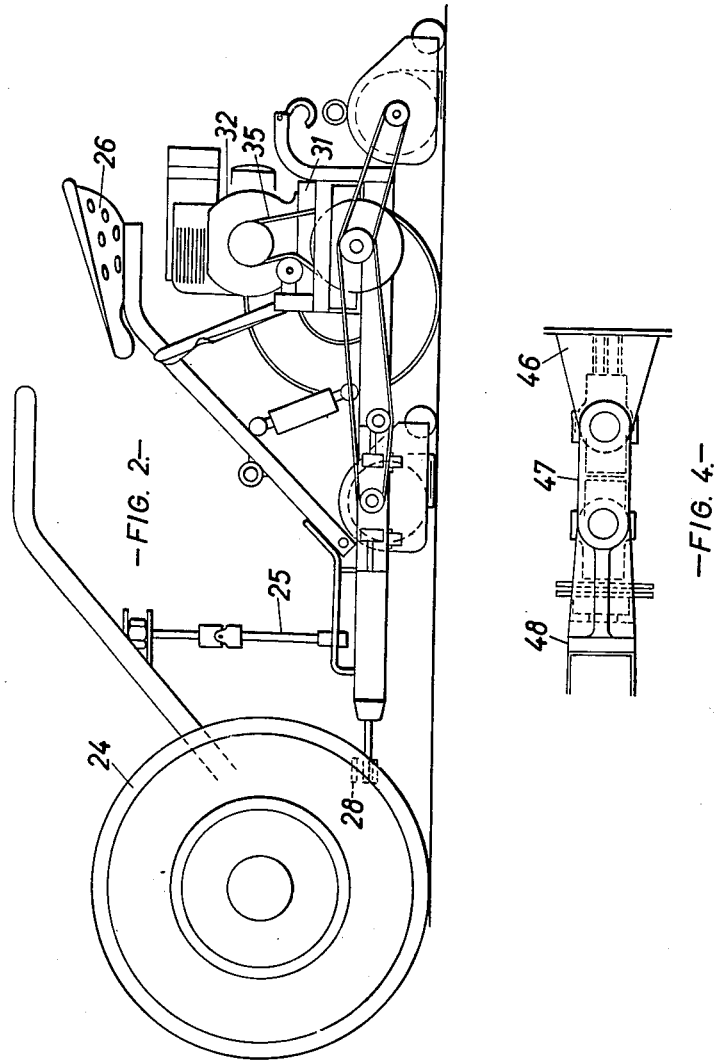

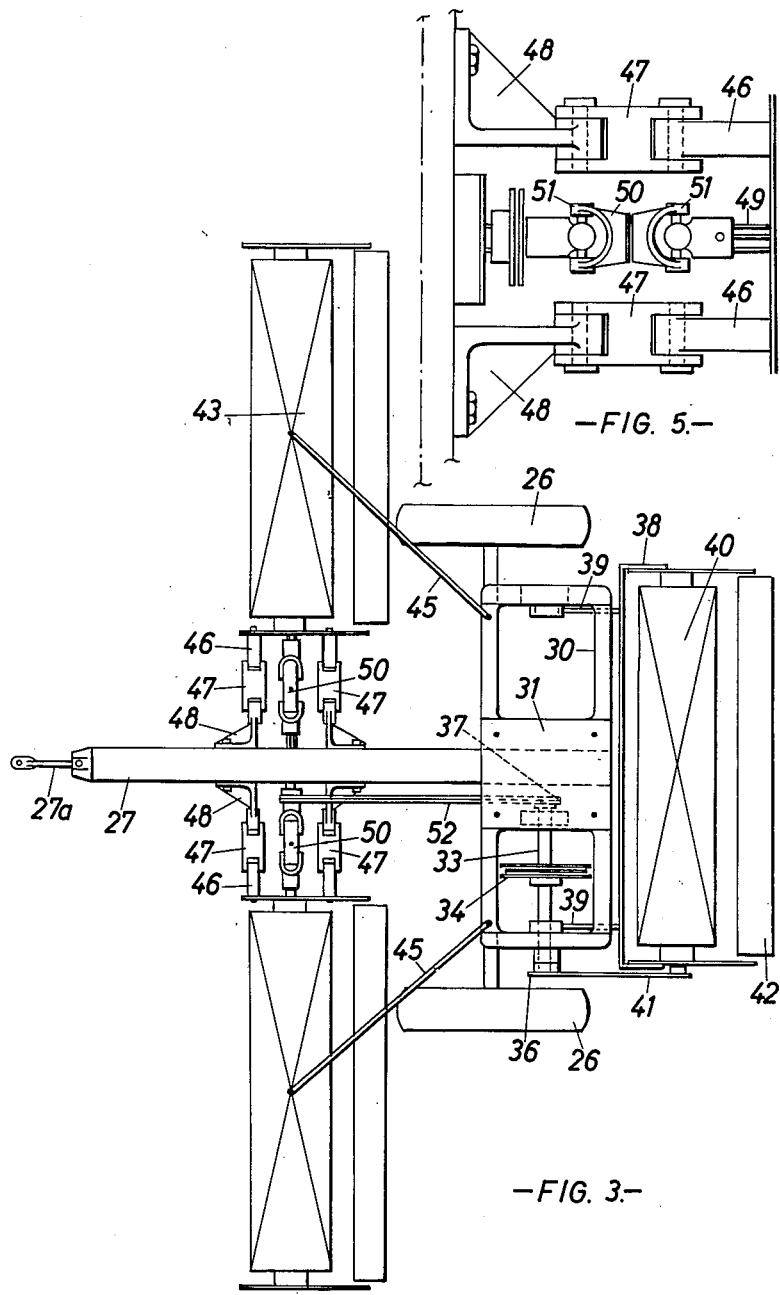

United States Patent Office 3,049,851
Patented Aug. 21, 1962

3,049,851
APPARATUS FOR WORKING TURF
Derek Burtt Hargreaves, Adlington, Macclesfield, and Eric Staniforth, Gatley, England, assignors to W. Hargreaves & Company Limited, a company of England
Filed July 27, 1959, Ser. No. 829,827
6 Claims. (Cl. 56—7)

This invention relates to apparatus for working turf of the kind comprising a frame adapted to be "hitched" to a powered chassis, said frame being adapted to carry units, such as a mower, each having a rotary turf-working member such as a cutter cylinder. The invention is particularly, but not exclusively, applicable to so-called "ganged" type grass mowers.

Hitherto, ganged grass mower units have either been attached to a towing frame behind a tractor, or have been mounted one behind and the others in outrigger formation on each side of the tractor. In such arrangement, it has also been proposed to drive the cutter cylinders from the power unit of the tractor. The first arrangement has the disadvantage that the units have to obtain driving power for the cutter cylinders from a roller or wheels, which limits their cutting capacity and efficiency, and also the freely trailing individual units are difficult to control to prevent bounce or rocking, which again affects their working efficiency. The second arrangement with power drive for the cutter cylinder, like the first, has the disadvantage that the tractor unit has to be fitted with an engine of greater power than is necessary for the other general uses of the tractor and such power increase necessarily entails increased initial cost and running expenses.

According to the present invention, apparatus for working turf comprising a frame adapted to be hitched to a powered chassis, said frame being adapted to carry a plurality of turf-working units each having a rotary turf-working member such as a cutter cylinder is characterised by a power unit mounted on the frame and means coupling said power unit to each of the rotary turf-working members for rotating the same, whereby the speed of rotation of such members is independent of the speed of travel of the frame and the apparatus may be hitched to a relatively low powered chassis.

The expression "relatively low powered chassis" is used to define a tractor or like powered unit normally incapable of operating equivalent non-powered turf-working units.

The apparatus aforesaid may be further characterised by means for resiliently loading the units towards the turf from the frame.

In the accompanying drawings:

FIG. 1 is an isometric view of one example of turf-working apparatus made in accordance with the present invention.

FIG. 2 is a side elevation of another example of turf-working apparatus made in accordance with the present invention coupled to a tractor.

FIG. 3 is a plan of the apparatus shown in FIG. 2.

FIGS. 4 and 5 are fragmentary views in elevation and plan on a larger scale of mounting and driving coupling means between two units of the apparatus.

As shown in FIG. 1 of the drawings, the apparatus comprises a frame 10 having at the front end a tow-bar 11 by which it is adapted to be "hitched" to a tractor. At the rear, the frame is fitted with double-tyred wheels 12 above which is a superstructure carrying a seat 13 and a platform carrying a small petrol engine 14.

Behind the chassis is mounted a mower unit with cutter cylinder 15. Near the seat is a lever 16 by which downward pressure may be applied to the mower unit through a spring 17. At each side of the frame in outrigger arrangement is another mower unit 18, 19 respectively which is mounted at its end adjacent the frame by parallel linkage so that the unit is free to rise and fall at each end. The cutter cylinder 18a and 19a are coupled by short shafts to a countershaft 20. Further levers 21, 22 adjacent the seat are connected through springs 21a, 22a to the mower units to enable downward pressure to be applied thereto. Each of the control levers 16, 21 and 22 is constructed in any known manner to enable the applied pressure to be maintained. The motor 14 is coupled by driving belt or chain, such as 23 to the shaft 20 and to the cylinder of the rear mower unit, by means not shown.

The apparatus above described may be hitched to a tractor to form a tractor-trailer combination as described in our earlier British Patent No. 723,103, whilst the downward loading of the individual mower units may be effected in the manner described in our earlier British Patent No. 702,385.

In the example shown in FIGS. 2 to 5 of the drawings, the turf-working apparatus is attached to a small power driven tractor 24, shown diagrammatically, by means incorporating a flexible link 25 in accordance with our earlier British Patent No. 723,103.

The turf-working implement comprises a chassis having a pair of wheels 26 and a draw shaft 27, the latter being adapted at 27a to be coupled to a towing lug 28 on the chassis. Mounted above the chassis as part thereof is a seat 29 for the driver, whilst below such seat is a frame 30 including a platform 31 for an engine 32 to drive the turf-working units of the apparatus.

Journalled in the frame 30 is a layshaft 33 carrying a pulley 34 for connection by V-belt 35 to the engine. On such layshaft are chain sprockets 36 and 37 for driving the rear and forward units respectively of the apparatus. The turf-working units shown are cylinder-type mowers, the rear unit 38 being connected by links 39 which are pivoted to the frame so as to swing about the axis of the layshaft and its cylinder 40 is coupled by driving chain 41 to the layshaft sprocket 36. Such mower unit has the usual following roller 42.

In advance of the rear mower unit are two forward mower units 43 and 44 similar to the rear mower unit and these are mounted in outrigger manner from each side of the draw shaft 27 by means shown more clearly in FIGS. 3 and 4, their position being determined by thrust rods 45 from the frame 30 of the chassis. The mounting of the leading pair of the three ganged mowers includes four brackets 48 attached to the sides of the draw shaft and pairs of links 47 connected at their other ends to a pair of complementary brackets 46 attached to the inner end of each mower unit. The pivots at each end of the links are in line and also their axes lie in the plane of the axis of the cutter cylinder of each unit and of a short cross shaft 49 journalled transversely of and carried by the draw shaft medially between the brackets 46. The cross shaft 49 and cutter cylinder of the mower are connected by a short driving link 50 and universal couplings 51 are so proportional and arranged that the centre of action of each universal joint is on the axis joining the complementary ends of the links 47. The cross shaft is driven by a chain 52 from the sprocket 37.

In operation, the rear mower unit is free to rise and fall within practical limits to allow it to follow normal undulations of the ground, such unit following the tilt of the chassis 30 on its wheels 26, and its cylinder is power driven from the engine 32 through the chain 41. Each front mower unit is free to tilt as well as to rise and fall relative to the chassis wheels 26, the pairs of links 47 facilitating in particular any rise or fall of the end of the unit adjacent the draw shaft. The driving link 50 follows the movements of the links 47 so that the mower cylinders are at all times coupled to the cross shaft 49 to be driven thereby through the chain 52 from the layshaft 33.

In operation, the provision of a separate motor for the cutter cylinders greatly extends the work-capacity of the apparatus as the speed of the cutter cylinders is independent of the speed of movement of the tractor. Thus, the tractor-trailer combination may either be driven forward at the maximum capacity of the cutter engine, slowing the tractor when the slowing speed of the cutter engine indicates increase of cutting load, or vice versa. Alternatively, the tractor may be driven at a predetermined speed relative to the cutter speeds and the number of blades on each cylinder, to give a predetermined number of cuts per yard.

The invention is not limited to all the details of the example above described insofar as they may be modified without departing from the invention.

The invention enables the lower powered chassis to be used for a normal purpose, such as for soil and ground cultivation and, therefore, equally enables such a powered cultivator to be used for a purpose hitherto considered beyond its capacity. The independence of relative speeds of the powered chassis and of the separate power unit for operating the working implements enables, for example, the cuts per yard of such implements to be selected at will.

We claim:

1. Apparatus for working turf comprising a main frame, said frame carrying a plurality of turf-working units each having its own frame, turf engaging wheels on each unit frame, a rotary turf-working member carried by each unit frame, an engine mounted on said main frame, a drive shaft driven by said engine for rotating said turf-working members, said drive shaft including a driven section and a free floating section between said driven section and each of said turf-working members, said free floating sections each having a universal joint at each end thereof, and free-floating linkage means connecting said turf-working units to said frame.

2. Apparatus according to claim 1 wherein said linkage means for each of said units includes a free floating link lying in the plane of said free floating drive shaft section, said link being pivoted at both ends between said frame and said turf-working unit, and said link being so positioned that the axes of said pivot points pass through the centers of the universal joints of said free floating drive shaft section.

3. Apparatus for working turf comprising a main frame, power means on said frame, ground-engaging wheels on said main frame defining the height and level thereof relative to the ground, and at least one turf-working implement connected to said frame comprising an implement frame, ground-engaging means on said implement frame to define the height and level thereof, a rotary turf-working implement on said implement frame, and means connecting the implement to the main frame comprising parallel link-and-shaft coupling for the frame and rotary implement permitting free self-determination of level for the implement frame relative to the ground with power transmission to the rotary implement.

4. Apparatus for working turf according to claim 3, the link-and-shaft coupling means comprising a pair of links of equal length pivotally mounted at each end in spaced arrangement on the main frame and implement frame respectively with the axes of such pivots at each end in alignment, and a drive coupling shaft having at each end a part of a universal joint with the effective centers of such joints substantially in alignment with the pivots at the respective ends.

5. Apparatus for working turf according to claim 3 in combination with means for resiliently loading the implement frame from the main frame.

6. Apparatus for working turf comprising a main frame, power means mounted on said frame, a draw bar forming part of the frame, a pair of wheels supporting the frame, a pair of brackets spaced apart on each side of the draw bar, brackets of each pair having coaxial pivot axes, a driving shaft mounted on the draw bar, one part of a universal joint on each end of the shaft having its effective center on the coaxial pivot axes, an implement frame on each side of the draw bar having corresponding pivot brackets, wheels supporting each implement frame, a rotary turf-working implement mounted on each implement frame, a drive shaft for said rotary implement located between the brackets, one part of a universal joint on said drive shaft having its effective center on the axes of the pivot brackets, a pair of links connecting the brackets of the main and implement frames and a coupling shaft with the other parts of the universal joints connecting the said drive shaft and the driving shaft.

References Cited in the file of this patent
UNITED STATES PATENTS

| | | |
|---|---|---|
| 2,743,567 | Martin | May 1, 1956 |
| 2,753,674 | Cunningham et al. | July 10, 1956 |
| 2,754,652 | Gilder | July 17, 1956 |
| 2,764,864 | Kinkead | Oct. 2, 1956 |